United States Patent [19]

King et al.

[11] 3,835,667

[45] Sept. 17, 1974

[54] DOUBLE CARDAN UNIVERSAL JOINT WITH IMPROVED CENTERING MEANS

[75] Inventors: Kenneth K. King, Saginaw; Robert L. White, Frankenmuth, both of Mich.

[73] Assignee: General Motors Corporation, Detroit, Mich.

[22] Filed: July 12, 1973

[21] Appl. No.: 378,789

[52] U.S. Cl.............................. 64/17 R, 64/8, 64/21
[51] Int. Cl............................................... F16d 3/26
[58] Field of Search .................... 64/21, 8, 17, 17 A

[56] References Cited
UNITED STATES PATENTS

| | | | |
|---|---|---|---|
| 2,945,364 | 7/1960 | Marquis et al............................ | 64/8 |
| 2,953,910 | 9/1960 | Hufstader............................ | 64/17 R |
| 2,983,119 | 5/1961 | Glover................................... | 64/21 |
| 2,986,022 | 5/1961 | Stokely............................... | 64/17 R |
| 2,991,634 | 7/1961 | Daley, Jr................................ | 64/21 |
| 3,310,961 | 3/1967 | Ristau..................................... | 64/21 |
| 3,792,598 | 2/1974 | Orain...................................... | 64/21 |

*Primary Examiner*—Samuel Scott
*Assistant Examiner*—Randall Heald
*Attorney, Agent, or Firm*—F. J. Fodale

[57] ABSTRACT

A double Cardan universal joint has a centering means in which the ball seat is biased into engagement with the centering ball with a constant spring force. Specifically, a movable ball seat is biased by a spring which reacts against a member which slides on the longitudinal axis of the yoke carrying the ball seat and which pivots on the yoke carrying the fixed centering ball about the centering ball center.

An improved sealing arrangement is also disclosed. Specifically, a synthetic rubber lip seal seals against the major diameter portion of an outer spherical surface on a sleeve carrying the ball seat. Such an arrangement removes the synthetic rubber lip seal from the heat generated by the centering ball and ball seat and minimizes the flexure of the lip seal during joint operation.

5 Claims, 1 Drawing Figure

PATENTED SEP 17 1974
3,835,667
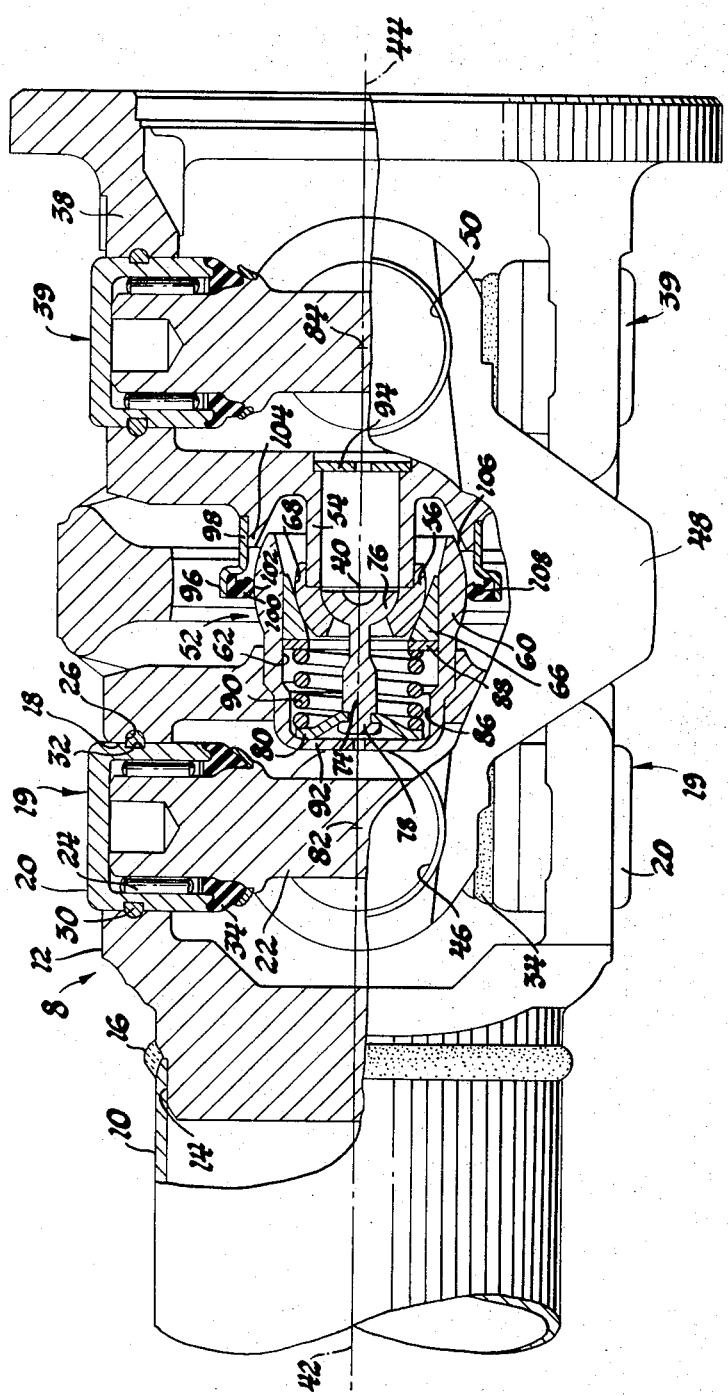

DOUBLE CARDAN UNIVERSAL JOINT WITH IMPROVED CENTERING MEANS

This invention relates generally to double Cardan universal joints and more particularly to the centering means for such a joint.

In the past, the centering means for a double Cardan universal joint has comprised a centering ball carried by one yoke member in bearing engagement with a seat carried by the other yoke member. In these known universal joints, the centering ball was generally fixed on its yoke member while the seat was slidably carried on its yoke member and biased into engagement with the centering ball by a spring. The spring took up wear and manufacturing tolerances, but more importantly, it accommodated the different positions of the seat with respect to the yoke member in which it slid required for the various angles of the joint.

So far as we are aware, in all of these known universal joints, the spring reacted against a surface fixed to the yoke slidably carrying the ball seat with the result that the spring forces decreased as the angle of the joint was increased. Thus in order for sufficient spring forces to be present at higher joint angles, these known joints had unnecessarily high spring forces at low joint angles. These unnecessarily high spring forces at low joint angles generate unwanted heat and increase the wear on the centering ball and ball seat bearing surfaces.

The primary object of our invention is to provide a centering means for a double Cardan universal joint or the like in which the ball seat is biased into engagement with the centering ball by a substantially constant spring force.

Another object of our invention is to provide a centering means for a double Cardan universal joint in which the spring biasing the ball seat into engagement with the centering ball reacts against a member maintained at a constant distance from the centering ball and perpendicular to the center line of the ball seat irrespective of the joint angles.

Another object of our invention is to provide a centering means for a double Cardan universal joint in which the spring biasing the ball seat into engagement with the centering ball reacts against a member carried by the yoke which carries the fixed centering ball and maintained at a constant distance from the centering ball center and perpendicular to the center line of the ball seat irrespective of the joint angle.

Yet another object of our invention is to provide a centering means for a double Cardan universal joint in which the spring biasing the ball seat into engagement with the centering ball reacts against a member which is pivoted on one yoke concentrically with a fixed centering ball and slides on another yoke coaxially with a ball seat slidably carried by the other yoke.

Yet still another object of our invention is to provide a sealed centering means for a double Cardan universal joint having a synthetic rubber lip seal in which the lip seal is removed from the deleterious effects of the heat generated by the centering ball and ball seat.

Still yet another object of our invention is to provide a sealed centering means for a double Cardan universal joint having a synthetic rubber lip seal which is flexed a minimal amount during operation of the joint.

The exact nature of this invention as well as other objects and features thereof will be readily apparent from consideration of the following specification relating to the single FIGURE drawing which is an elevational view of a double Cardan universal joint with parts broken away and in section to illustrate the construction of the centering means.

Referring now to the drawing, the double Cardan universal joint illustrated therein is indicated generally at 8. A hollow shaft 10 such as one section of an automotive propeller shaft is secured to one yoke 12 of the universal joint 8, extending over a reduced diameter portion 14 formed on the outward end of the yoke 12 and welded thereto as at 16. A pair of apertures 18 are formed through spaced ears of the yoke 12 to receive a conventional cross-shaped spider and bearing assembly 19. Bearing cups 20, non-rotatably secured in the apertures 18 and annuli of needle rollers 24 disposed between the bearing cup 20 and two ends of the cross-shaped spider 22 provide relatively frictionless pivoting of the spider 22 on the yoke 12 during operation of the joint.

Each of the bearing cups is retained in its respective yoke aperture 18 by a retaining ring 30 disposed in an annular groove 32 in the bearing cup 20 and an aligned annular groove 26 in the aperture 18. A seal 34 may be suitably secured to the open end of each cup 20 to retain the annuli of needle rollers 24 therein and to prevent the entry of dirt and other foreign material into the interior of the cup.

The joint 8 includes a second yoke member 38 which is adapted for connection to the end of a second shaft or the next propeller shaft section (not shown). The construction of the bearing cup and spider assembly 39 is essentially the same as that above-described with respect to the assembly 19 mounted in yoke member 12.

A connecting member 48 of generally H-shape extends between the two yokes 12 and 38 and has a first set of spaced apertures 46 receiving bearing cups and pivoting the other two ends of the cross-shaped spider 22 of assembly 19 on the connecting member 48. The second set of apertures 50 similarly receive bearing cups for pivoting the remaining two arms of the cross-shaped spider of assembly 39. The connecting member 48 provides the structural torque transmitting connection between the yoke members 12 and 38.

In order to coordinate the pivoting movement of the yoke members 12 and 38 about their respective centers 82 and 84, it is necessary to establish a joint center at which the longitudinal axes 42 and 44 of the yoke members 12 and 38 respectively intersect for a given joint angle. This is provided by a centering means indicated generally by the numeral 52.

The centering means 52 comprises a hollow stub shaft 54 extending from the yoke member 38 which has a hollow spherical ball 56 fixedly secured on the end thereof. The inner surface of the ball 56 is also spherical and concentric with the center 40 of the hollow ball.

A cup-shaped sleeve 60 fixedly secured to the yoke member 12 surrounds the centering ball 56. The sleeve 60 has a cylindrical bore 62 which slidably receives a ball seat 66. The ball seat 66 is illustrated in its preferred form as a single annulus having a conical inner surface 68. However, it may comprise a plurality of pieces and the inner surface may be generally spherical conforming more or less to the ball 56. The advantage of the conical surface 68 is it may be wedged between the ball 56 and the bore 62 and thus more accurately seat the centering ball.

A ball stud 74 has a smaller ball 76 seated within the hollow ball 56 for pivotal movement about the ball center 40. Secured to the end 78 of the stud 74 is a plate-like spring reaction member 80 which is piloted in a reduced bore 86 at the closed end of the cupped sleeve 60. A coil spring 90 acting between the reaction member 80 and a washer 88 biases the ball seat 60 into bearing engagement with the centering ball 56 thus establishing the ball center 40 as the joint center at which the longitudinal axes 42 and 44 intersect when the joint is angulated.

When the joint is at zero angle as illustrated in the FIGURE, the centers 82, 40 and 84 are aligned and the ball seat 66 and the centering ball 56 are at a minimum distance from the pivotal centers 82 and 84 for their respective yokes 12 and 38. When the joint is angulated, however, the yoke member 38 pivots about the center 84 and the ball center 40 being fixed on the yoke member 38 is swung in a fixed arcuate path to some point at a greater distance from the center 82 than the minimum distance shown in the FIGURE. The distance between the centers 82 and 40 increases with increasing joint angle and is compensated for by the ball seat moving outwardly from the center 82 under the action of spring 90.

In prior constructions, the spring 90 reacted against a surface fixed on the yoke member 12 and lengthened with increasing joint angle which decreased the spring forces biasing the ball seat 66 into bearing engagement with the ball 56. Thus in prior constructions, in order to provide sufficient spring loads at higher angles, it was necessary to contend with higher-than-necessary spring loads at lower angles. These higher-than-necessary spring loads at lower angles increase wear between the bearing surfaces and generate undesireable heat.

In our construction, the spring reacts against the spring reaction member 80 which is maintained at a constant distance from the ball center 40 and the ball seat 66 irrespective of the angle between the axes 42 and 44. More particularly, the spring reaction member 80 is connected to the yoke member 38 which fixedly carries the ball 56 by the ball stud 74 which pivots inside the ball 56 on the center 40. As the joint angulates, the ball stud 74 is made to pivot by the piloting engagement of the spring reaction member 80 within the reduced bore 86 of the cupped sleeve 60. Consequently, the spring reaction plate 80 is always substantially coaxial with and perpendicular to the axes 82 at a constant distance from the center 80. Thus the spring load biasing the ball seat 66 into engagement with the centering ball 56 is constant irrespective of the joint angle and higher-than-necessary spring load at lower joint angles need not be contended with. While the spring load may vary somewhat due to changing points of contact between the ball seat 66 and the centering ball 56, or wear occasioned by the bearing engagement therebetween, these variations are minor compared to the variations present in past construction due to the spring reacting against a surface fixed on the yoke member which carried the movable ball seat.

Another improvement incorporated into the universal joint 8 is that in the sealing of the centering means 52 which are normally in a grease packed compartment. In order to provide such a compartment, the cupped sleeve 60 includes the end wall 92 and the bore of the hollow stud 54 is closed by a plate 94. Both the end wall 92 and the plate 94 have small central holes for supplying or replenishing grease. The particular area of improving the sealing of the centering means lies in the flexible lip seal 96.

The lip seal comprises a sheet metal mounting ring 98 to which is bonded a synthetic rubber annulus 100 having a flexible sealing lip 102. The sheet metal annulus is pressed on circular ledge 104 of the yoke 38 and the sealing lip 102 is biased by a garter spring 108 into engagement with a spherical outer surface 106 of the sleeve 60 concentric with the center 40 at zero angle. The lip 102 engages the spherical outer surface 106 substantially at the major diameter when the joint is aligned as shown in the drawing. Because of such placement, the lip 102 need expand and contract circumferentially only a minimal amount as the joint angulates and rotates. Further, since the sealing lip 102 does not contact either the centering ball 56 or the ball seat 66 directly, it is not as nearly affected by the heat generated thereby during operation of the joint. Thus synthetic rubbers having a lower temperature tolerance may be used for the seal 96.

We wish it to be understood that we do not desire to be limited to the exact details of construction shown and described, for obvious modifications will occur to a person skilled in the art.

We claim:

1. In a double Cardan universal joint having first and second yoke members, centering means comprising a ball having a center midway between said yoke members fixedly carried by said first yoke member, a sleeve enclosing said ball fixedly carried by said second yoke member, ball seat means slidably disposed in said sleeve, a reaction member disposed in said sleeve, a spring disposed in said sleeve, said spring being compressed between said ball seat means and said reaction member and biasing said ball seat means into engagement with said ball, and means for maintaining said reaction member at a constant distance from said center and perpendicular to the axis of said ball seat means irrespective of the operating angle of the joint whereby said spring biases said ball seat means into engagement with said ball with a substantially constant force.

2. In a double Cardan universal joint having first and second yoke members, centering means as defined in claim 1 wherein said last named means comprises means mounting said reaction member on said first yoke member for pivoting movement about said center and piloting means maintaining said reaction member coaxial with the longitudinal axis of said second yoke member.

3. In a double Cardan universal joint having first and second yoke members, centering means as defined in claim 1 wherein said sleeve has an external partispherical surface and further having a seal secured to said first yoke member and including a flexible, rubber-like annulus biased into sealing engagement with said external partispherical surface of said sleeve at the maximum diameter thereof when the longitudinal axes of said first and second yoke members are aligned whereby said flexible, rubber-like annulus is substantially removed from the frictional heat generated by the ball and the ball seat during joint operation and is required to expand and contract its interior opening a minimum amount responsive to joint angulation.

4. In a double Cardan universal joint having first and second yoke members, centering means comprising
- a hollow ball having a center midway between said yoke members fixedly carried by said first yoke member with said center lying on the longitudinal axis of said first yoke member,
- a sleeve enclosing said ball fixedly carried by said second yoke member,
- ball seat means slidably disposed in said sleeve in a coaxial relationship with the longitudinal axis of said second yoke member,
- a reaction member disposed in said sleeve and slidably piloted on an internal surface of said sleeve, said internal surface being coaxially disposed with respect to the longitudinal axis of said second yoke member,
- a ball stud having a ball portion in bearing engagement with an interior surface of said hollow ball and a stud portion secured to said reaction member, and
- a spring having linearly variable load deflection characteristics compressed between said ball seat means and said reaction member and biasing said ball seat means into engagement with said ball,
- said ball stud and said internal surface of said sleeve maintaining said reaction member at a constant distance from said center and coaxial with said longitudinal axis of said second yoke member irrespective of the operating angle of the joint whereby said spring biases said ball seat means into engagement with said ball with a substantially constant force.

5. In a double Cardan universal joint having first and second yoke members, centering means as defined in claim 4 wherein said sleeve has an external partispherical surface and further having a seal secured to said first yoke member and including a flexible, rubber-like annulus biased into sealing engagement with said external partispherical surface of said sleeve at the maximum diameter thereof when the longitudinal axes of said first and second yoke members are aligned whereby said flexible, rubber-like annulus is substantially removed from the frictional heat generated by the ball and the ball seat during joint operation and is required to expand and contract its interior opening a minimum amount responsive to joint angulation.

* * * * *